US009377712B2

(12) United States Patent
Okuda

(10) Patent No.: US 9,377,712 B2
(45) Date of Patent: Jun. 28, 2016

(54) TONER STORAGE DEVICE, TONER CARTRIDGE, IMAGE FORMING UNIT, AND IMAGE FORMING APPARATUS

(71) Applicant: Sharp Kabushiki Kaisha, Osaka-shi, Osaka (JP)

(72) Inventor: Takeshi Okuda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/678,137

(22) Filed: Apr. 3, 2015

(65) Prior Publication Data

US 2015/0301480 A1 Oct. 22, 2015

(30) Foreign Application Priority Data

Apr. 17, 2014 (JP) ................................ 2014-085440

(51) Int. Cl.
*G03B 15/08* (2006.01)
*G03G 15/08* (2006.01)

(52) U.S. Cl.
CPC .... *G03G 15/0865* (2013.01); *G03G 2215/0132* (2013.01); *G03G 2215/0802* (2013.01); *G03G 2215/0819* (2013.01); *G03G 2215/0827* (2013.01)

(58) Field of Classification Search
USPC ......... 399/107, 110, 111, 119, 120, 252, 258, 399/262, 263
See application file for complete search history.

(56) References Cited

U.S. PATENT DOCUMENTS 7,236,726 B2 * 6/2007 Mori .................. G03G 15/0868 399/252
8,218,998 B2 * 7/2012 Koido ................ G03G 15/0898 399/103

FOREIGN PATENT DOCUMENTS

JP 2006-284776 A 10/2006

* cited by examiner

*Primary Examiner* — Hoan Tran
(74) *Attorney, Agent, or Firm* — Keating & Bennett, LLP

(57) ABSTRACT

A toner storage device includes a toner storage case that stores toner, and a stirring paddle rotatably supported in the toner storage case and includes at least one stirring blade that stirs the toner stored in the toner storage case, and a rotating shaft that rotates the at least one stirring blade, wherein the toner storage case includes a first supporting portion that rotatably supports an end of the rotating shaft of the stirring paddle, a second supporting portion that rotatably supports an other end of the rotating shaft, and a tapered portion that is tapered toward the first supporting portion.

17 Claims, 13 Drawing Sheets

TONER STORAGE DEVICE, TONER CARTRIDGE, IMAGE FORMING UNIT, AND IMAGE FORMING APPARATUS

TECHNICAL FIELD

This invention relates to a toner storage device for storing a toner, a toner cartridge including the toner storage device, an image forming unit including the toner cartridge, and an image forming apparatus including the image forming unit.

BACKGROUND ART

An image forming apparatus adopting the electrophotographic method transfers an image formed on a photoreceptor drum onto a sheet, and then heats and presses the sheet to fix the toner image on the sheet. In the image forming apparatus adopting the electrophotographic method, toner should be supplied when toner is used up. For this reason, the image forming apparatus adopting the electrophotographic method is generally configured to use a replaceable toner cartridge in which expendable toner is stored.

A toner cartridge includes a stirring paddle for stirring the toner stored in the toner storage container. The stirring paddle keeps a constant mixture ratio of a toner component to a carrier component of the toner stored in the toner storage container and prevents the solidification of toner (for example, refer to JP-A-2006-284776).

Usually, the stirring paddle is manually assembled to a toner storage container having a substantially rectangular shape. A supporting portion of the toner storage container supporting one end of a rotating shaft of the stirring paddle is located at a longitudinal end of the toner storage container. It is difficult for an assembly personnel to observe the supporting portion of the toner storage container thus configured. So that the assembly personnel has to find the supporting portion by pushing one end of the rotating shaft against the end of the toner storage container. If the assembly personnel has a trouble finding the supporting portion, the assembly operation takes longer time, degrading productivity. Such problem is not particular to a toner cartridge. Similar problem may arise, such as, for a cleaner unit collecting toner remaining on a photoreceptor drum or an intermediate transfer belt.

SUMMARY OF THE INVENTION

The object of the present invention is to provide a toner storage device allowing a stirring paddle to be attached easily thereto, a toner cartridge including the toner storage device, an image forming unit including the toner storage device and/or the toner cartridge, and an image forming apparatus including the image forming unit.

According to the present invention, there is provided a toner storage device comprising: a toner storage case for storing toner; and a stirring paddle which is configured to be rotatably supported in the toner storage case and which comprises: at least one stirring blade configured to stir the toner stored in the toner storage case; and a rotating shaft configured to rotate said at least one stirring blade, wherein the toner storage case comprises: a first supporting portion that rotatably supports an end of the rotating shaft of the stirring paddle; a second supporting portion that rotatably supports an other end of the rotating shaft; and a tapered portion that is tapered toward the first supporting portion.

According to the present invention, a toner storage device that allows a stirring paddle to be attached easily thereto, a toner cartridge including the toner storage device, an image forming unit including the toner storage device and/or the toner cartridge, and an image forming apparatus including the image forming unit can be provided.

DESCRIPTION OF THE PREFERRED EMBODIMENTS

Figure 1:
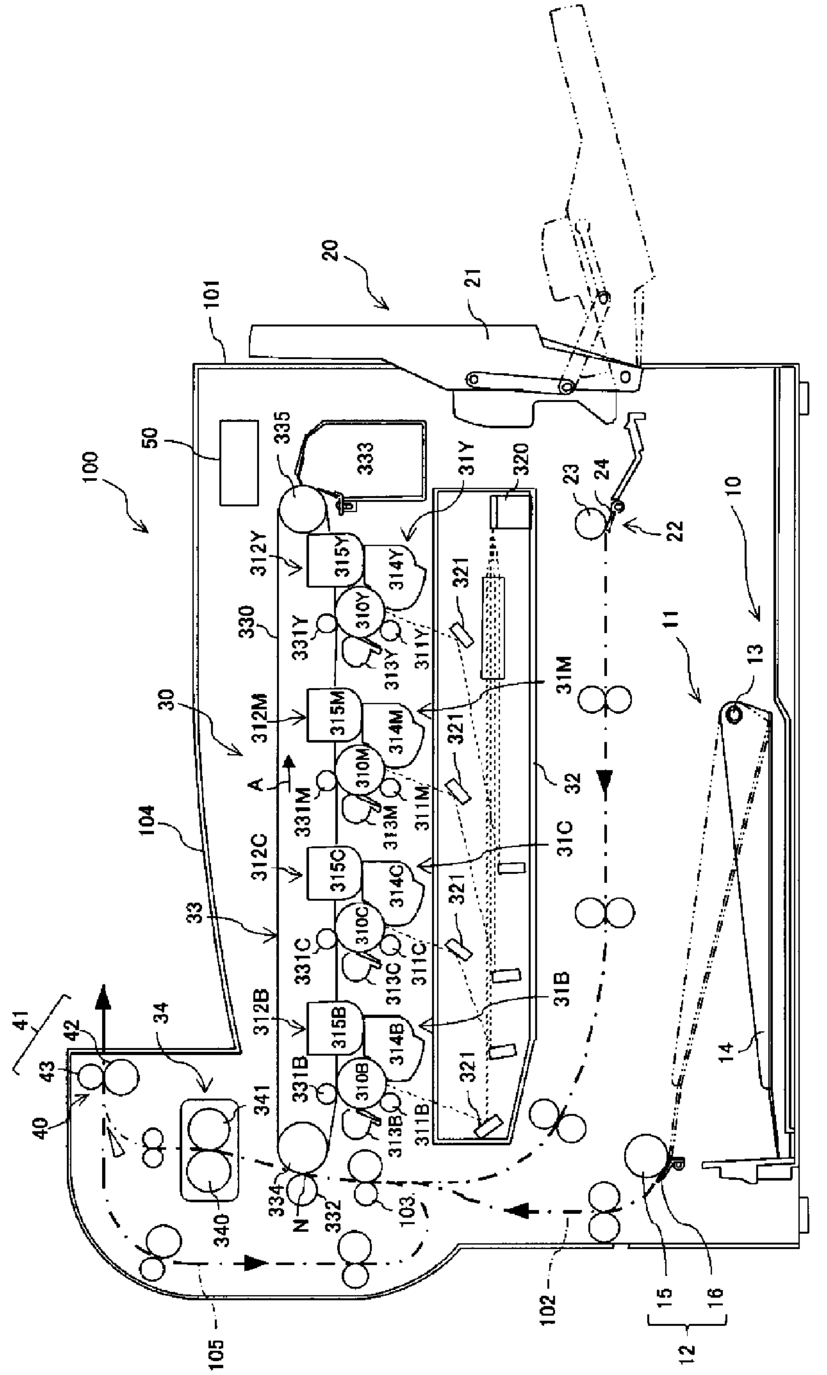
FIG. 1 is a figure illustrates a cross sectional view schematically illustrating a printer according to a first embodiment of the present invention.

An image forming apparatus including a toner storage device according to an embodiment of the present invention will be described referring to the drawings. The image forming apparatus according to the embodiment is a copying machine, a printer, a facsimile machine, or a multifunction machine thereof. As an example of the image forming apparatus according to the embodiment, a color laser beam printer adopting the electrophotographic method (hereinafter referred to as "printer") 100 will be described.

First Embodiment

A printer 100 according to a first embodiment of the present invention will be described referring to FIGS. 1 to 9D. A schematic configuration of the printer 100 will be described referring to FIG. 1. FIG. 1 is a cross sectional view schematically illustrating the printer 100 according to the first embodiment of the present invention.

As illustrated in FIG. 1, the printer 100 includes a sheet feeding section 10 that feeds sheets, a manual-feed unit 20 configured to manually feed sheets, an image forming section 30 that forms an image on a sheet fed from the sheet feeding section 10 or the manual-feed unit 20, a sheet discharge section 40 that discharges a sheet with an image formed thereon out of the apparatus, and a controller 50 that controls these components.

The sheet feeding section 10 includes a feeding sheet stacking part 11 storing a stacked sheets to be fed and a separately feeding part 12 that feeds a sheet stacked on the feeding sheet stacking part 11 one by one. The feeding sheet stacking part 11 includes a pivot tray 14 that pivots about a pivot-shaft 13. When feeding a sheet, the pivot tray 14 pivots to raise the sheet (the state illustrated in two-dot chain lines in FIG. 1). The separately feeding part 12 includes a pick-up roller 15 that feeds the sheet raised by the pivot tray 14 and a separation pad 16 that comes into pressure-contact with the pick-up roller 15.

The manual-feed unit 20 includes a manual-feed tray 21 on which sheets can be stacked and a separately feeding part 22 configured to separately feed a sheet stacked on the manual-feed tray 21 one by one. The manual-feed tray 21 is pivotally supported by the printer body 101. When sheets are fed manually, the manual-feed tray 21 pivots to a position where the sheets can be stacked thereon (the state illustrated in two-dot chain lines in FIG. 1). The separately feeding part 22 includes a feed roller 23 that feeds the sheets stacked on the manual-feed tray 21 and a separation pad 24 that comes into pressure-contact with the feed roller 23.

The image forming section 30 includes four processing cartridges (image forming units) 31Y to 31B for forming images of yellow (Y), magenta (M), cyan (C), and black (B), an exposure device 32 that exposes the surface of photoreceptor drums 310Y to 310B, which will be described later, a transfer section 33 that transfers the toner image formed on the surface of the photoreceptor drums 310Y to 310B to the sheet, and a fixing section 34 that fixes the toner image transferred to the sheet.

The four processing cartridges 31Y to 31B are each configured to be detachable to the printer body 101 so to be replaceable. The four processing cartridges 31Y to 31B have the same configuration except the color of the image formed thereby. The description is made only for the configuration of the processing cartridge 31Y for forming a yellow (Y) image, and the description on the processing cartridges 31M to 31B is omitted. The last alphabet letter (Y, M, C, B) of each reference sign represents the color (yellow, magenta, cyan, and black).

The processing cartridge 31Y includes a photoreceptor drum 310Y which is an image carrier, an electrifying roller 311Y that electrifies the photoreceptor drum 310Y, a developing device 312Y that develops an electrostatic latent image formed on the photoreceptor drum 310Y, and a cleaner unit 313Y that removes the toner remaining on the surface of the photoreceptor drum 310Y. The developing device 312Y includes a developing device body 314Y that develops the photoreceptor drum 310Y and a toner cartridge (toner storage device) 315Y that supplies toner to the developing device body 314Y. The toner cartridge 315Y is configured to be detachable to the developing device body 314Y. When the stored toner is used up, the toner cartridge 315Y is removed from the developing device body 314Y to be replaced. The toner cartridge 315Y will later be described in detail.

The exposure device 32 includes a light source 320 that emits a laser beam and a plurality of mirrors 321 or the like that guides the laser beam to the photoreceptor drums 310Y to 310B.

The transfer section 33 includes an intermediate transfer belt 330 that carries the toner image formed on the photoreceptor drums 310Y to 310B, primary transfer rollers 331Y to 331B that primarily transfer the toner image formed on the photoreceptor drums 310Y to 310B to the intermediate transfer belt 330, a secondary transfer roller 332 that secondarily transfers the toner image carried by the intermediate transfer belt 330 to a sheet, and a cleaner unit 333 that removes the toner remaining on the intermediate transfer belt 330. The intermediate transfer belt 330 is looped around a driving roller 334 and a driven roller 335. The primary transfer rollers 331Y to 331B press the intermediate transfer belt 330 onto the photoreceptor drums 310Y to 310B. The secondary transfer roller 332 nips (sandwiches) the intermediate transfer belt 330 in cooperation with the driving roller 334. The secondary transfer roller 332 transfers the toner image carried on the intermediate transfer belt 330 to the sheet at the nipping part N.

The fixing section 34 includes a heating roller 340 that heats the sheet and a pressing roller 341 that is pressed against the heating roller 340. The sheet discharge section 40 is configured with a pair of discharge rollers 41. The pair of discharge rollers 41 includes a discharge roller 42 that can normally and reversely rotate and a driven roller 43 that is rotatably driven by the discharge roller 42.

The controller 50 includes a sheet feeding section 10, a manual-feed unit 20, a CPU that performs drive control of the image forming section 30 and the sheet discharge section 40, and a memory that stores various types of programs and information. The controller 50 integrally controls and operates the sheet feeding section 10, the manual-feed unit 20, the image forming section 30, and the sheet discharge section 40 to form an image on the sheet.

Now, the image forming operation of the printer 100 thus configured (the control of image forming by the controller 50) will be described. For the embodiment, the image forming operation of forming an image on a sheet stacked on the feeding sheet stacking part 11 according to image information input from an external PC will described.

When image information is input from an external PC to the printer 100, the exposure device 32 emits a laser beam toward the photoreceptor drums 310Y to 310B according to the input image information. The photoreceptor drums 310Y to 310B are previously electrified by the electrifying rollers 311Y to 311B, and then irradiated with the laser beam to form electrostatic latent images thereon. The electrostatic latent images are developed (transformed into toner images) by the developing devices 312Y to 312B to form toner images of yellow (Y), magenta (M), cyan (C), and black (B) on the photoreceptor drums 310Y to 310B. The toner images of these respective colors formed on the photoreceptor drums 310Y to 310B are sequentially superimposed and transferred onto the intermediate transfer belt 330 rotating in the direction shown in the arrow A by the primary transfer rollers 331Y to 331B. The sequentially superimposed toner images (full color toner images) are conveyed to the secondary transfer roller 332 by the intermediate transfer belt 330.

In parallel with the image forming operation, the separately feeding part 12 feeds the sheet stacked on the feeding sheet stacking part 11, one by one, to the sheet conveyance path 102. A pair of registration rollers 103 located in the downstream of the sheet conveyance path 102 corrects the sheet to be straight, and the sheet is conveyed to the nipping part N at a predetermined timing of conveyance. When the sheet is conveyed to the nipping part N, the nipping part N transfers the toner image from the intermediate transfer belt 330 onto the sheet. The fixing section 34 melts the transferred toner image to fix the toner image onto the sheet. The sheet with the toner image fixed thereon is discharged out of the apparatus by the pair of discharge rollers 41. The sheet discharged out of the apparatus is stacked on the discharged sheet stacking section 104 provided on the top face of the printer body 101.

To form images on both faces (a first face and a second face) of the sheet, the sheet with an image formed on the first face (front face) thereof is conveyed, instead of discharging out to the discharged sheet stacking section 104, to a conveyance path for two-sided printing 105 by reversely rotating the discharge roller 42. The sheet is again conveyed to the image forming section 30 via the conveyance path for two-sided printing 105. Similarly to the first face, an image is formed on the second face (back face), and the sheet is discharged out of the apparatus.

Figure 2:
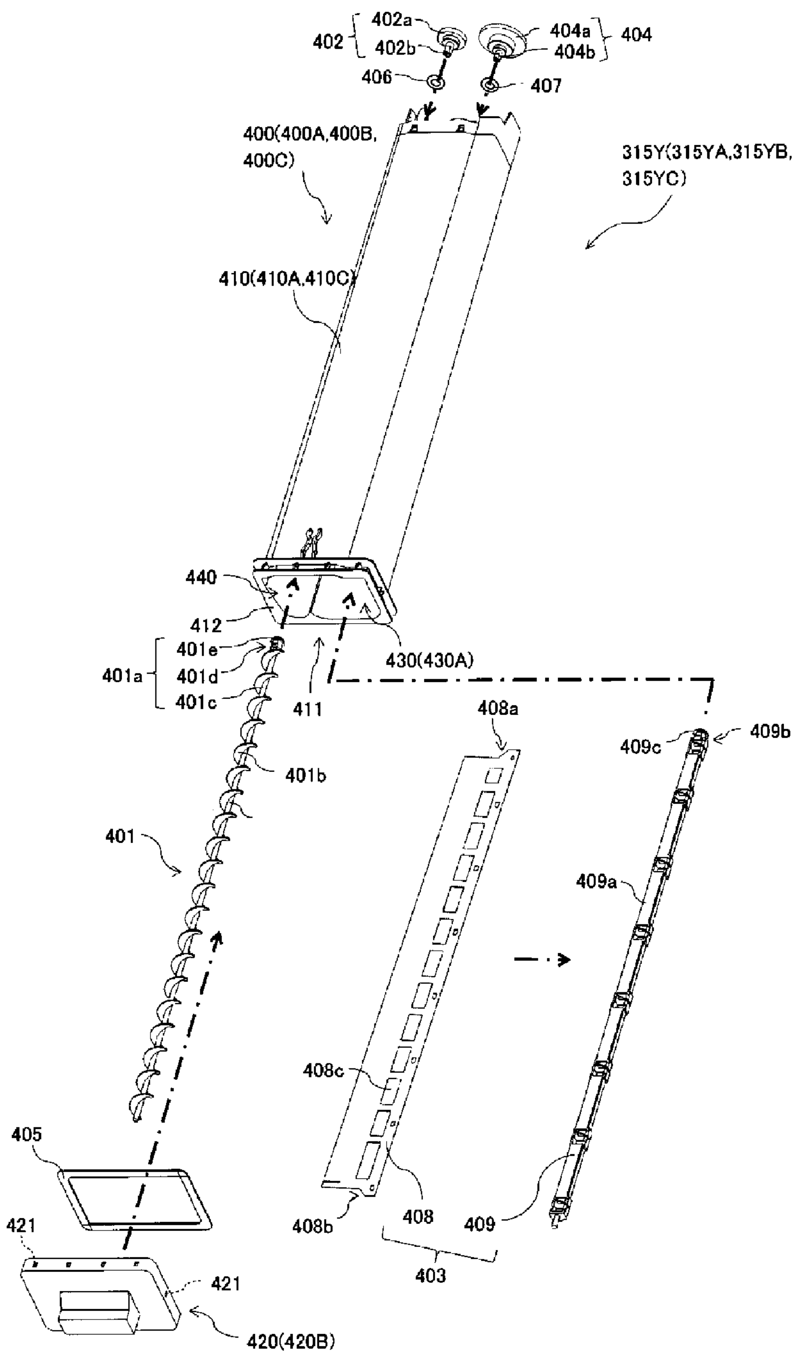
FIG. 2 is a figure illustrates an exploded assembly drawing of a toner cartridge according to the first embodiment.

Now, the toner cartridge 315Y will specifically be described referring to FIGS. 2 to 9D. The schematic configuration of the toner cartridge 315Y will be described referring to FIGS. 2 to 6B. FIG. 2 is an exploded assembly drawing of the toner cartridge 315Y according to the first embodiment of the present invention. FIGS. 3A and 3B illustrate a stirring paddle 403 and an auger screw 401 contained in a toner storage container 400 illustrated in FIG. 2. FIGS. 4A and 4B illustrate a storage container body 410 of the toner cartridge 315Y illustrated in FIG. 2. FIGS. 5A to 5C illustrate a front cover 420 of the toner cartridge 315Y illustrated in FIG. 2. FIGS. 6A and 6B are partially enlarged cross sectional views of the storage container body 410 containing the stirring paddle 403.

As illustrated in FIG. 2, the toner cartridge 315Y includes a toner storage container (toner storage case) 400 that stores yellow toner (hereinafter, referred to as "toner"), an auger screw 401 that conveys the toner stored in the toner storage container 400, a driving force transmitting gear 402 that transmits the driving force from the driving source to the auger screw 401, a stirring paddle 403 that stirs the toner stored in the toner storage container 400, and a driving force transmitting gear (driving force transmitting unit) 404 that transmits the driving force from the driving source to the stirring paddle 403.

The toner storage container 400 is formed in a sealed container having a substantially rectangular shape. The toner storage container 400 includes a storage container body (storage case body) 410 having an opening 411 at one of longitudinal ends and a front cover (lid portion) 420 that seals the opening 411 of the storage container body 410. The toner storage container 400 is sealed by attaching the front cover 420 to the storage container body 410 storing toner with a packing 405 assembled therebetween. The front cover 420 is assembled to the storage container body 410 by engaging a plurality of engaging claws 421 provided on the front cover 420 with the flange 412 provided on the periphery of the opening 411 of the storage container body 410.

Figure 3A:
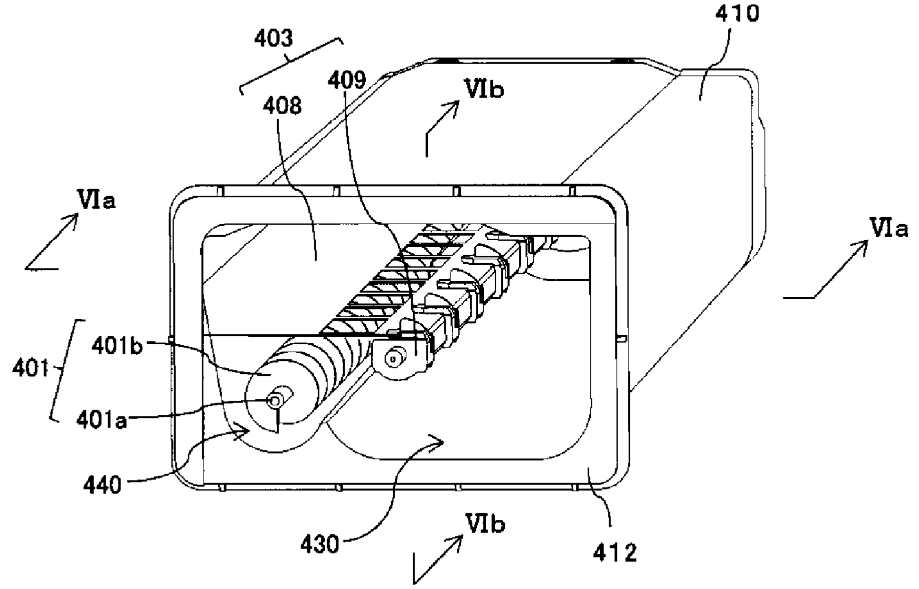
FIGS. 3A and 3B are figures illustrate a stirring paddle and an auger screw contained in a toner storage container body illustrated in FIG. 2.
Figure 3B:
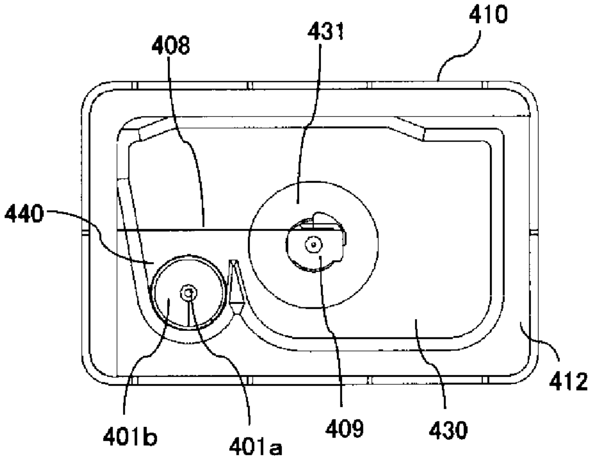

As illustrated in FIG. 3A, the storage container body 410 has therein a toner storage space 430 of a large volume in which the most of toner is stored and the stirring paddle 403 is disposed and a toner conveyance space 440 of a small volume that adjoins the toner storage space 430 and accommodates the auger screw 401 therein. The toner storage space 430 and the toner conveyance space 440 extend along the longitudinal direction of the storage container body 410. Thus, the auger screw 401 and the stirring paddle 403 are disposed along the longitudinal direction of the storage container body 410. The auger screw 401 and the stirring paddle 403 are inserted from the opening 411. As illustrated in FIG. 3B, the opening 411 has a size allowing the auger screw 401 and the stirring paddle 403 to be inserted therethrough.

Figure 4A:
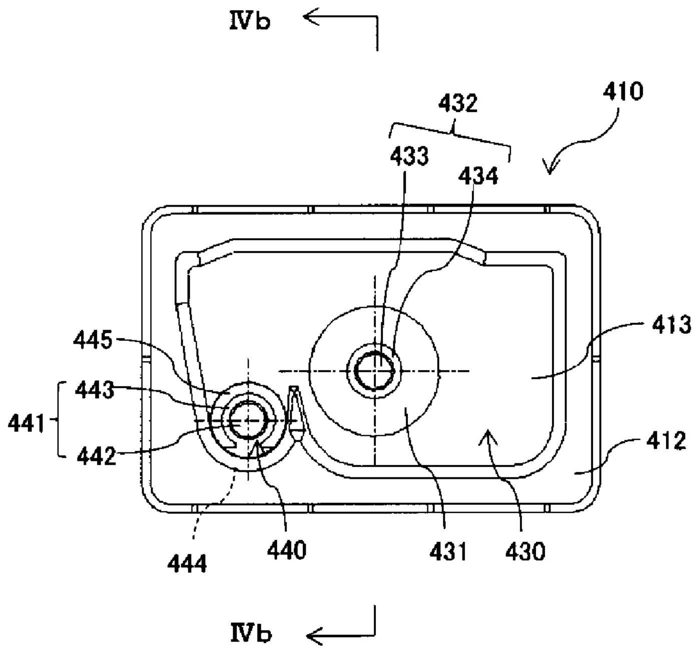
FIGS. 4A and 4B are Figures illustrate a storage container body of the toner cartridge illustrated in FIG. 2.
Figure 4B:
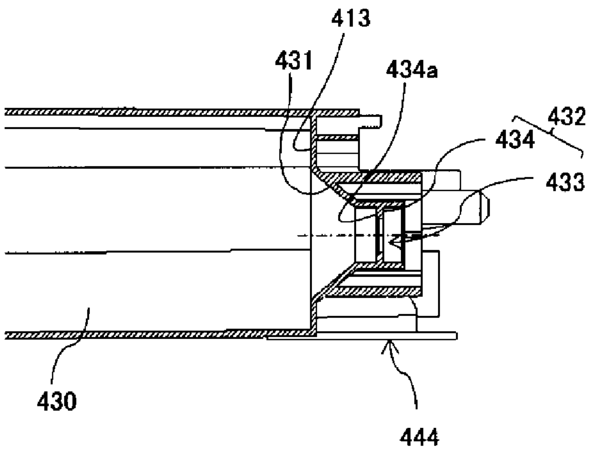

As illustrated in FIGS. 4A and 4B, a first tapered portion (tapered portion) 431 is provided on an end 413 of the toner storage space 430, where the end 413 is on the longitudinally opposite side of the opening 411. The first tapered portion 431 is tapered toward the direction opposite to the opening 411 along the longitudinal direction. The first tapered portion 431 is provided at a substantially central portion of the end 413 of the storage container body 410. A first paddle supporting portion (a first supporting portion) 432 that rotatably supports the stirring paddle 403 is provided on the distal end of the first tapered portion 431.

The first tapered portion 431 is formed in a substantially conical shape to guide the rotating shaft 409 of the stirring paddle 403 to the first paddle supporting portion 432.

The first paddle supporting portion 432 has a through hole 433 that penetrates the storage container body 410 and allows the rotating shaft 409 of the stirring paddle 403 to be disposed therein and an engagement portion 434 configured to engage with a flange 409*c* of the rotating shaft 409. The through hole 433 is formed slightly larger than the diameter of the rotating shaft 409 of the stirring paddle 403 to allow the rotating shaft 409 to rotate. The engagement portion 434 includes an abutment face 434*a* provided to be perpendicular to the axial direction of the stirring paddle 403. The abutment face 434*a* contacts the flange 409*c* of the rotating shaft 409.

The toner conveyance space 440 includes a first screw supporting portion 441 on the end located longitudinally opposite to the opening 411 (in the downstream side along the toner conveyance direction). The first screw supporting portion 441 rotatably supports the downstream end along the toner conveyance direction of the auger screw 401. The first screw supporting portion 441 has a through hole 442 that penetrates the storage container body 410 and allows the rotating shaft 401*a* of the auger screw 401 to be disposed therein and an engagement portion 443 configured to engage with a flange 401*e* of the rotating shaft 401*a*. The flange 401*e* will be described later.

A discharge port 444 for discharging the toner is provided below the first screw supporting portion 441. The discharge port 444 communicates with the developing device body 314Y (see FIG. 1). An inclined portion 445 is provided in the direction in which toner is conveyed so as to incline toward the rotating shaft 401*a* of the auger screw 401 above the discharge port 444. The inclined portion 445 is formed in a tapered shape tapering toward the downstream along the toner conveyance direction. The inclined portion 445 is provided in a region around the rotating shaft 401*a* except the region between the rotating shaft 401*a* and the discharge port 444.

A shutter (not shown) that opens and closes the discharge port 444 is provided below the discharge port 444. The shutter is configured to open the discharge port 444 when the toner cartridge 315Y is attached to the developing device body 314Y, and to close the discharge port 444 when the toner cartridge 315Y is detached from the developing device body 314Y.

Figure 5A:
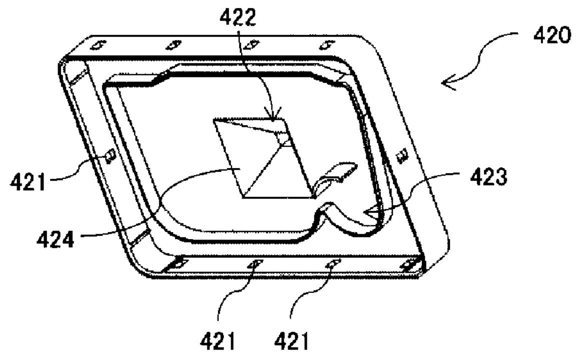
FIGS. 5A to 5C are figures illustrate a front cover of the toner cartridge illustrated in FIG. 2.
Figure 5B:
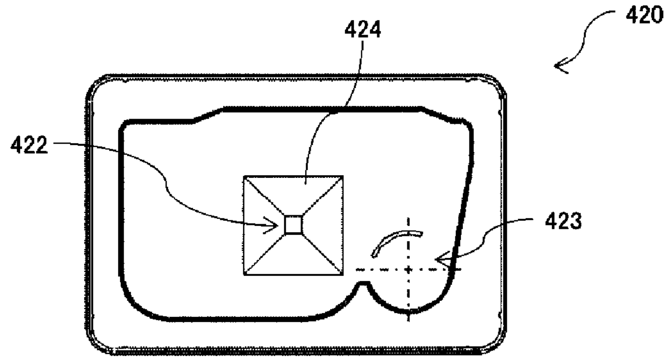
Figure 5C:
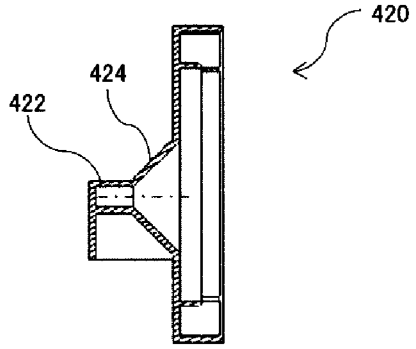

The front cover 420 is formed to seal the opening 411 of the storage container body 410. As illustrated in FIGS. 5A to 5C, the front cover 420 includes a second paddle supporting portion (second supporting portion) 422 that rotatably supports the other end of the stirring paddle 403 and a second screw supporting portion 423 that rotatably supports the upstream end along the toner conveyance direction of the auger screw 401.

The second paddle supporting portion 422 is provided in the location opposing the first paddle supporting portion (first supporting portion) 432 of the toner storage space 430. The second paddle supporting portion 422 rotatably supports the stirring paddle 403 with the front cover 420 sealing the opening 411. A second tapered portion (lid side tapered portion)

424 that guides the stirring paddle 403 to the second paddle supporting portion 422 when attaching the front cover 420 to the storage container body 410 is provided in a region around the second paddle supporting portion 422. The second tapered portion 424 is formed in a substantially quadrangular pyramid shape. The second paddle supporting portion 422 is located at the distal end of the second tapered portion 424. The second tapered portion 424 may have any shape that can guide the stirring paddle 403 to the second paddle supporting portion 422. For example, the second tapered portion 424 may have a substantially conical shape or a pyramid shape.

The second screw supporting portion 423 is provided in the location opposing the first screw supporting portion 441 of the toner conveyance space 440. The second screw supporting portion 423 rotatably supports the auger screw 401 with the front cover 420 sealing the opening 411.

The auger screw 401 includes the rotating shaft 401*a* rotatably supported by the toner storage container 400 and a spiral blade 401*b* that conveys toner toward the discharge port 444. The rotating shaft 401*a* includes a shaft body 401*c*, a coupling portion 401*d* that couples with the driving force transmitting gear 402, and a flange 401*e* that engages with the engagement portion 443. The flange 401*e* is shaped to protrude from the outer circumferential face of the coupling portion 401*d* in the direction perpendicular to the axial direction. The flange 401*e* engages with the engagement portion 443, thereby axially positioning the coupling portion 401*d* disposed in the through hole 442. The spiral blade 401*b* conveys a predetermined amount of toner according to the rotational speed.

The driving force transmitting gear 402 includes a gear part 402*a* that meshes with the driving force transmitting gear 404 and a drive shaft 402*b* provided on the rotating shaft of the gear part 402*a*. A sealing member 406 is arranged between the driving force transmitting gear 402 and the engagement portion 443. The sealing member 406 prevents toner from leaking from the toner conveyance space 440. The driving force transmitting unit is not limited to the driving force transmitting gear 402. For example, a timing belt may be used, or a configuration of a direct driving type may be used.

The stirring paddle 403 includes a stirring blade 408 that stirs toner and a rotating shaft 409 that rotates the stirring blade 408. The stirring blade 408 includes a first inclined portion 408*a* (see FIG. 6A) and a second inclined portion 408*b* (see FIG. 2). The first inclined portion 408*a* is formed to have an edge substantially parallel to the inclined angle of the first tapered portion 431 provided in the toner storage space 430 of the storage container body 410 so as to fit along the first tapered portion 431. The second inclined portion 408*b* is formed to have an edge substantially parallel to the inclined angle of the second tapered portion 424 provided on the front cover 420 so as to fit along the second tapered portion 424. Because the stirring blade 408 is provided with the first inclined portion 408*a* and the second inclined portion 408*b*, the stirring paddle 403 can rake out and stir the toner that intrudes into the first tapered portion 431 and the second tapered portion 424. Thus, the stored toner can further efficiently be used. The stirring blade 408 includes a plurality of openings 408*c* to reduce the resistance force produced by stirring. The plurality of openings 408*c* reduces the load on the stirring paddle 403.

Figure 6A:
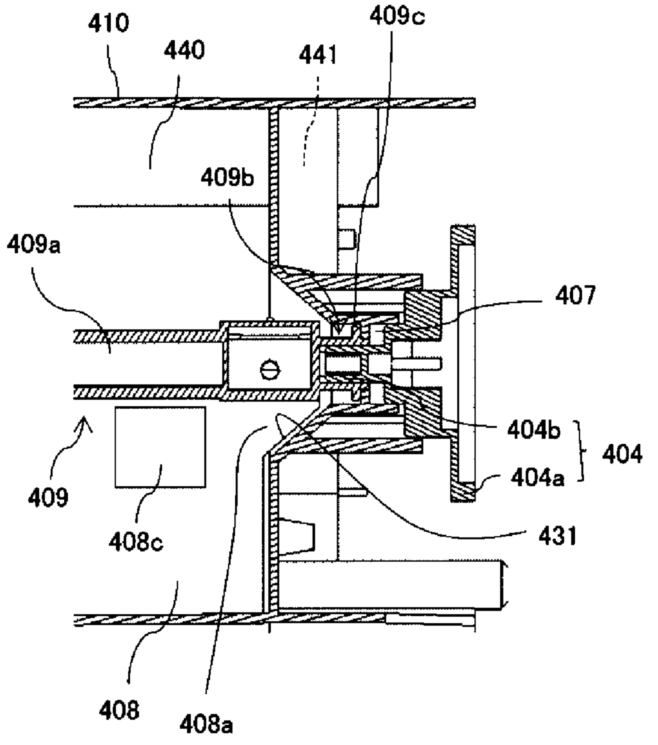
FIGS. 6A and 6B are figures illustrate partially enlarged cross sectional views of the storage container body containing the stirring paddle.
Figure 6B:
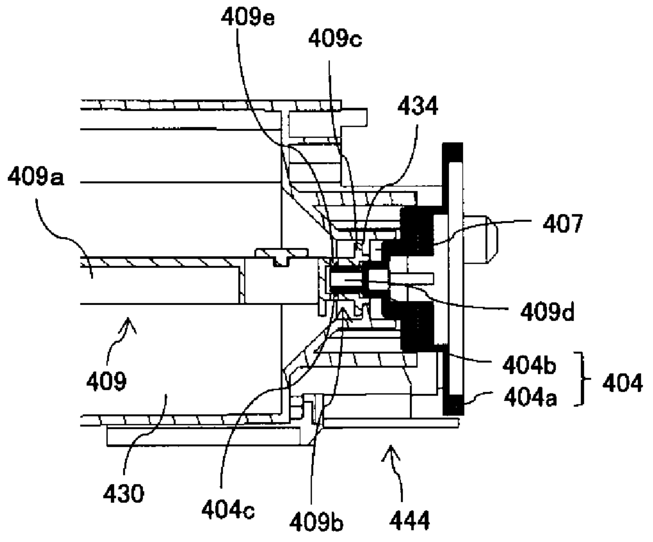

As illustrated in FIG. 6B, the rotating shaft 409 includes a shaft body 409*a*, a coupling portion 409*b* that couples with the driving force transmitting gear 404, and a flange 409*c* that engages with the engagement portion 434. The coupling portion 409*b* includes an insertion hole 409*d* allowing the engaging claw 404*c* provided on the drive shaft 404*b* of the driving force transmitting gear 404 to be inserted therein. The insertion hole 409*d* has a engaged portion 409*e* (see FIG. 7A, which will be described later) that engages with the engaging claw 404*c*. That is, the drive shaft 404*b* of the driving force transmitting gear 404 is formed in a male-shape, and the coupling portion 409*b* of the stirring paddle 403 is formed in a female-shape. The flange 409*c* is shaped to protrude from the outer circumferential face of the coupling portion 409*b* in the direction perpendicular to the axial direction. The flange 409*c* serves, such as, to axially position the coupling portion 409*b* disposed in the through hole 433.

The driving force transmitting gear 404 includes a gear part 404*a* that is coupled to the driving source and a drive shaft 404*b* provided on the rotating shaft of the gear part 404*a*. A sealing member 407 is arranged between the driving force transmitting gear 404 and the engagement portion 434. The sealing member 407 prevents toner from leaking from the toner storage space 430.

Now, the operation of assembling the stirring paddle 403 to the toner cartridge 315Y thus configured will be described referring to FIGS. 7A to 9D. First, the assembling of the stirring paddle 403 to the storage container body 410 will be described referring to FIGS. 7A to 8C. FIGS. 7A to 7C and FIGS. 8A to 8C illustrate the assembling of the stirring paddle 403 to the storage container body 410.

Figure 7A:
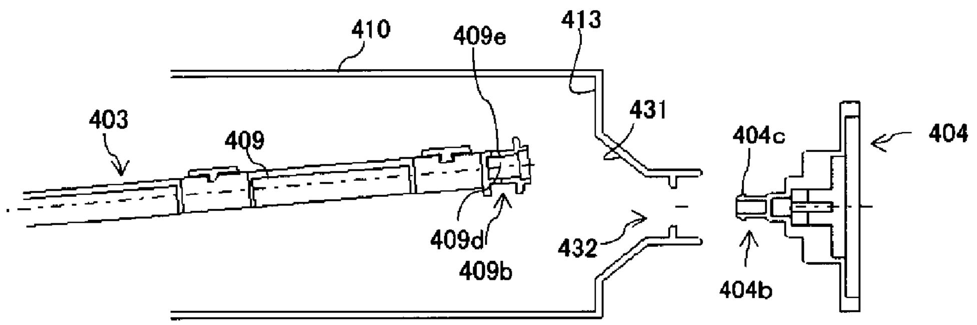
FIGS. 7A to 7C are figures illustrate assembling of the stirring paddle to the storage container body.
Figure 7B:
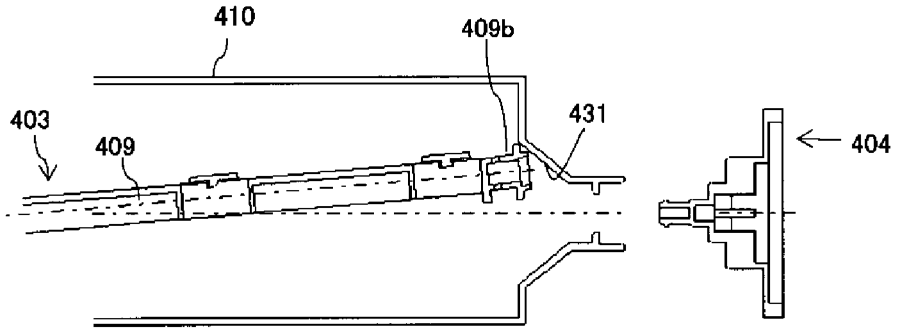

As illustrated in FIGS. 7A and 7B, an assembly personnel first inserts the stirring paddle 403 through the opening 411 of the storage container body 410 to make the coupling portion 409*b* provided on the distal end of the rotating shaft 409 abut the first tapered portion 431 of the storage container body 410. The first tapered portion 431 is provided in the substantially central portion of the end 413 of the storage container body 410 located in the opposite side of the opening 411. So that the assembly personnel inserts the stirring paddle 403 toward the region around the substantially central portion to make the coupling portion 409*b* abut the first tapered portion 431.

Figure 7C:
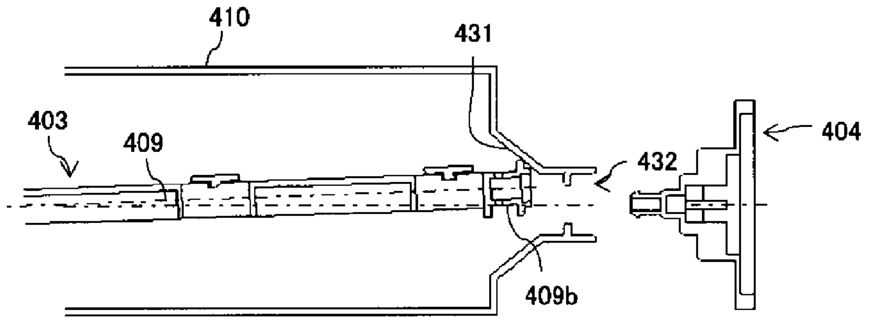
Figure 8A:
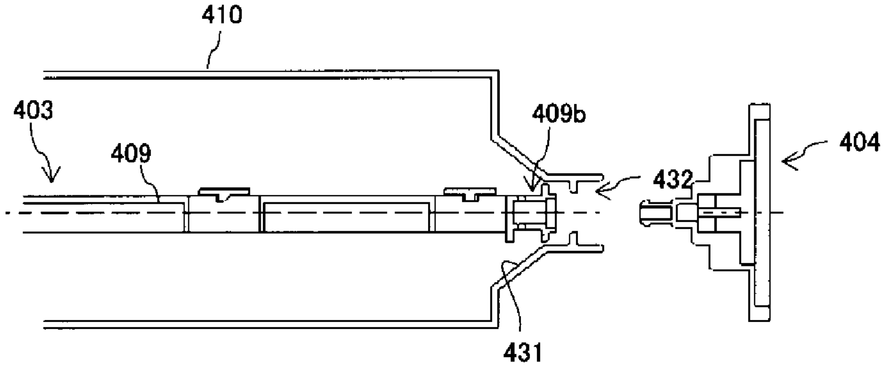
FIGS. 8A to 8C are figures illustrate assembling of the stirring paddle to the storage container body.
Figure 8B:
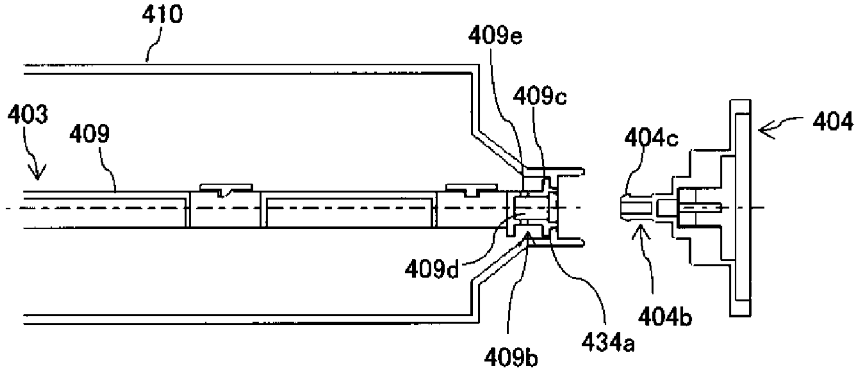

As illustrated in FIG. 7C, when the assembly personnel inserts the stirring paddle 403 further deeper into the storage container body 410, the coupling portion 409*b* of the stirring paddle 403 travels along the first tapered portion 431 toward the first paddle supporting portion 432. When the coupling portion 409*b* comes to the first paddle supporting portion 432 as illustrated in FIG. 8A, the flange 409*c* abuts the abutment face 434*a* and thereby the stirring paddle 403 is positioned inside the storage container body 410 as illustrated in FIG. 8B.

Figure 8C:
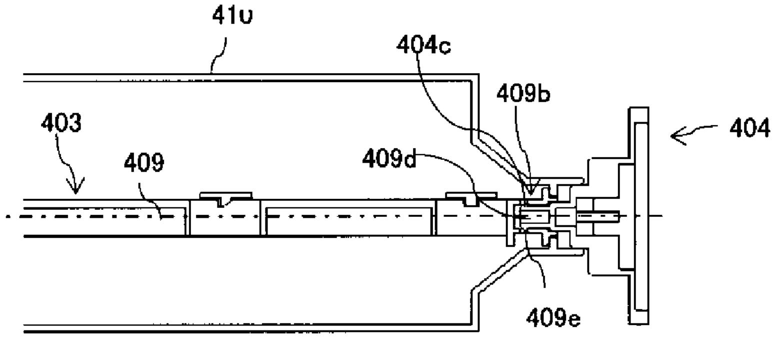

When the stirring paddle 403 is positioned, as illustrated in FIG. 8C, the driving force transmitting gear 404 is coupled, from outside the storage container body 410, with the coupling portion 409*b* located in the first paddle supporting portion 432. Specifically, the engaging claw 404*c* provided on the drive shaft 404*b* of the driving force transmitting gear 404 is inserted in the insertion hole 409*d* of the coupling portion 409*b* to engage with the engaged portion 409*e* of the insertion hole 409*d*. The stirring paddle 403 and the driving force transmitting gear 404 are thus coupled.

Now, the assembling of the front cover 420 to the storage container body 410 to which the stirring paddle 403 is assembled is described referring to FIGS. 9A to 9D. FIGS. 9A to 9D illustrate the assembling of the front cover 420 to the storage container body 410 to which the stirring paddle 403 is assembled.

Figure 9A:
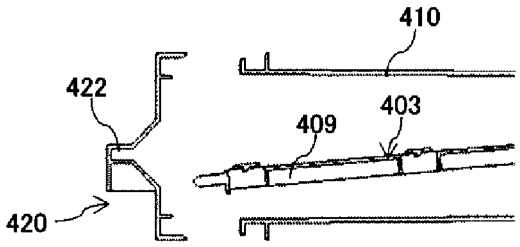
FIGS. 9A to 9D are figures illustrate assembling of a front cover to the storage container body to which the stirring paddle is assembled.
Figure 9B:
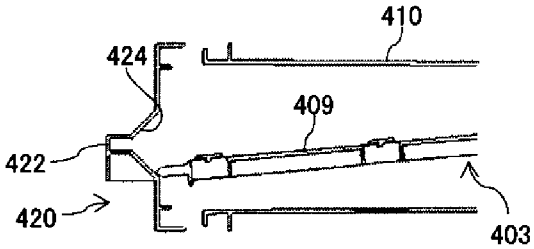
Figure 9C:
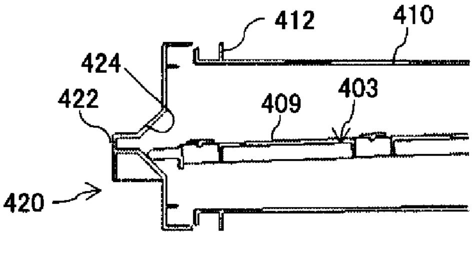

As illustrated in FIG. 9A, the other end of the rotating shaft 409 of the stirring paddle 403 assembled to the storage container body 410 is displaced to some extent from the location of the second paddle supporting portion 422 (not coaxially positioned) due to the effect of gravity. As for the embodiment, the front cover 420 is provided with the second tapered portion 424. The second tapered portion 424 is provided in a substantially central portion of the front cover 420. Thus, as the storage container body 410 comes close to the front cover 420, the other end of the rotating shaft 409 of the stirring paddle 403 abuts the second tapered portion 424 as illustrated in FIG. 9B. With the other end of the rotating shaft 409 of the stirring paddle 403 abutting the second tapered portion 424, by simply advancing the front cover 420 toward the storage container body 410, the other end of the rotating shaft 409 is guided toward the second paddle supporting portion 422 as illustrated in FIG. 9C. So that the other end of the rotating shaft 409 of the stirring paddle 403 does not hit against the front cover 420 and does not disturb the assembling of the front cover 420.

Figure 9D:
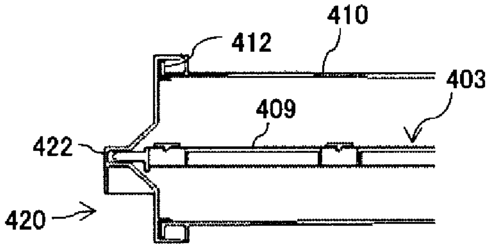

As illustrated in FIG. 9D, when the front cover 420 further comes close to the storage container body 410, the other end of the rotating shaft 409 of the stirring paddle 403 is supported by the second paddle supporting portion 422 of the front cover 420. By a plurality of engaging claws 421 (see FIG. 2) of the front cover 420 engaging with the flange 412 of the storage container body 410, the opening 411 of the storage container body 410 is sealed.

As described above, the toner cartridge 315Y according to the first embodiment includes the first tapered portion 431 that can guide the coupling portion 409*b* of the stirring paddle 403 to the first paddle supporting portion 432 of the storage container body 410. Thus the stirring paddle 403 can easily be assembled to the storage container body 410. This shortens the time of assembling the stirring paddle 403 to the storage container body 410, thereby improving productivity.

The first tapered portion 431 is formed in a substantially conical shape, tapering toward the first paddle supporting portion 432. So that the first tapered portion 431 smoothly guides the coupling portion 409*b* of the stirring paddle 403 to the first paddle supporting portion 432. In this manner, no additional load is applied to the rotating shaft 409 of the stirring paddle 403, thereby preventing damaging the rotating shaft 409 during assembly of the stirring paddle 403.

By providing the toner cartridge 315Y according to the first embodiment with the first tapered portion 431, the location of the coupling between the rotating shaft 409 and the driving force transmitting gear 404 and the location of the coupling between the driving force transmitting gear 404 and the gear part 404*a* can be close to each other. This reduces the displacement (inclination) of the axis of the gear part 404*a* caused by an allowance in the coupling or the like during rotation of the driving force transmitting gear 404. Consequently, the change in the point of meshing with a gear (not shown) for transmitting the drive force to the gear part 404*a* can be reduced. As a result, an overload or a loss in transmitting a driving force from the gear (not shown) to the gear part 404*a* or the like can be prevented. The noise caused by meshing can also be suppressed.

The first tapered portion 431 provided in the toner cartridge 315Y according to the first embodiment reduces the amount of the toner intruding into the vicinity of the engagement portion 434 of the first paddle supporting portion 432. This is achieved because the first tapered portion 431 is tapered and the first paddle supporting portion 432 is located at the distal end of the first tapered portion 431 (see FIG. 6B). So that the leakage of toner from the first paddle supporting portion 432 can be prevented.

Furthermore, for example, when the through hole 433 is formed somewhat larger than the coupling portion 409*b* (for example, with the diameter of 7 mm for the coupling portion, and the diameter of 7.2 mm for the through hole) to prevent condensation of toner in the first paddle supporting portion 432, the amount of toner around the first paddle supporting portion 432 is small and thus the leakage of toner from the first paddle supporting portion 432 can preferably be prevented (see FIG. 6B).

Furthermore, the sealing member 407 is disposed between the engagement portion 434 and the driving force transmitting gear 404. This further preferably prevents the leakage of toner (see FIG. 6B).

The toner cartridge 315Y according to the first embodiment includes the second tapered portion 424 that can guide the other end of the stirring paddle 403 to the second paddle supporting portion 422 of the front cover 420 (see FIG. 5). Thus the front cover 420 can easily be assembled to the storage container body 410 to which the stirring paddle 403 is assembled. This shortens the time of assembling the toner storage container 400, thereby improving productivity.

The stirring blade 408 of the stirring paddle 403 includes the first inclined portion 408*a* shaped to fit along the inclination of the first tapered portion 431 and the second inclined portion 408*b* shaped to fit along the inclination of the second tapered portion 424 (see FIG. 2). So that, even when the first tapered portion 431 and the second tapered portion 424 are provided, the toner that intrudes into the first tapered portion 431 and the second tapered portion 424 can be raked out and discharged. In this manner, the stored toner can be used efficiently.

Second Embodiment

A printer 100A according to a second embodiment of the present invention will be described referring to FIGS. 10 and 11B while quoting FIG. 2. In the printer 100A according to the second embodiment, the shape of the first tapered portion that guides one end of the stirring paddle to the first paddle supporting portion is different from the first embodiment. Description is made for the second embodiment mainly on the portion different from the first embodiment, that is, on the first tapered portion. The component configured similarly to that of the first embodiment is appended with the same reference sign, and the description thereof is omitted.

First, a schematic configuration of the printer 100A according to the second embodiment will be described referring to FIGS. 2, 10, 11A, and 11B. FIG. 10 is a cross sectional view schematically illustrating the printer 100A according to the second embodiment of the present invention. FIGS. 11A and 11B illustrate a storage container body 410A of a toner cartridge 315YA according to the second embodiment.

Figure 10:
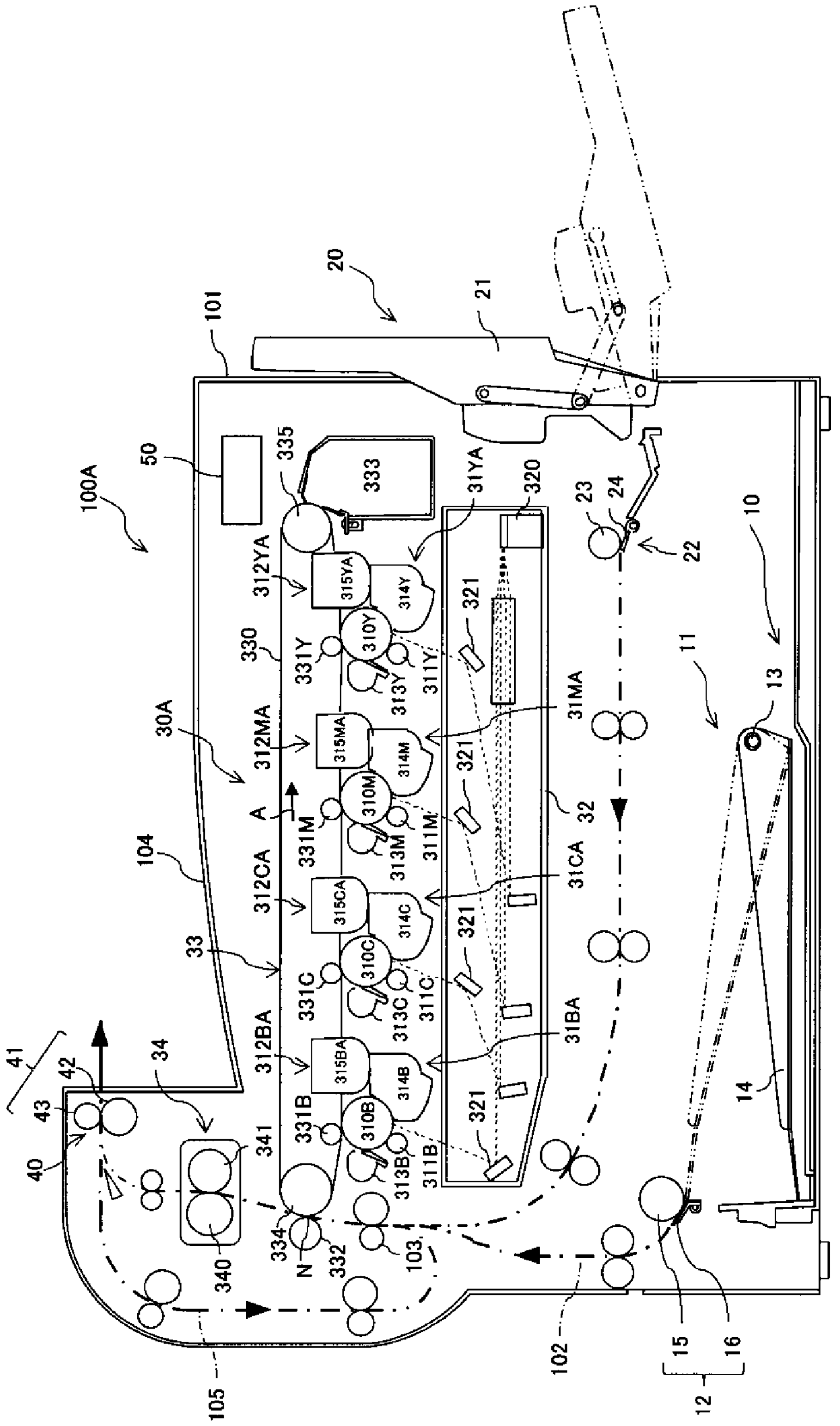
FIG. 10 is a figure illustrates a cross sectional view schematically illustrating a printer according to a second embodiment of the present invention.
Figure 11A:
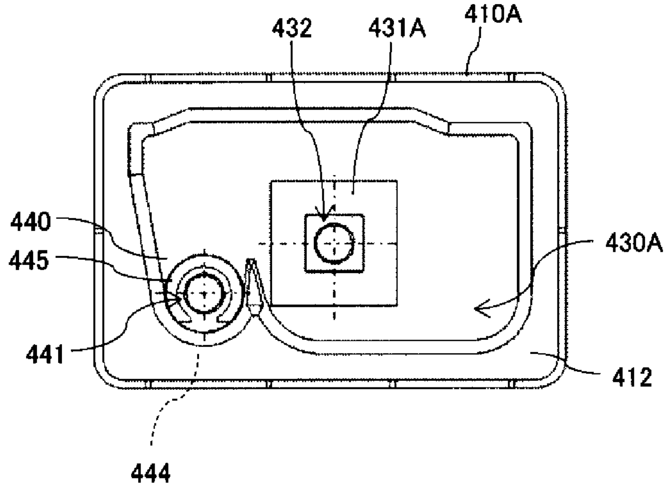
FIGS. 11A and 11B are figures illustrate a storage container body of the toner cartridge according to the second embodiment.

As illustrated in FIG. 10, the printer 100A includes a sheet feeding section 10, a manual-feed unit 20, an image forming section 30A, a sheet discharge section 40, and a controller 50. The image forming section 30A includes four processing cartridges (image forming units) 31YA to 31BA, an exposure device 32, a transfer section 33, and a fixing section 34. The processing cartridge 31YA includes a photoreceptor drum 310Y, an electrifying roller 311Y, a developing device 312YA, and a cleaner unit 313Y. The developing device 312YA includes a developing device body 314Y and a toner cartridge (toner storage device) 315YA.

As illustrated in FIG. 2, the toner cartridge 315YA includes a toner storage container (toner storage case) 400A storing toner, an auger screw 401, a driving force transmitting gear 402, a stirring paddle 403, and a driving force transmitting gear (driving unit) 404. The toner storage container (toner storage case) 400A is formed in a sealed container having a substantially rectangular shape. The toner storage container 400A includes a storage container body 410A having an opening 411 on a longitudinal end and a front cover 420.

Figure 11B:
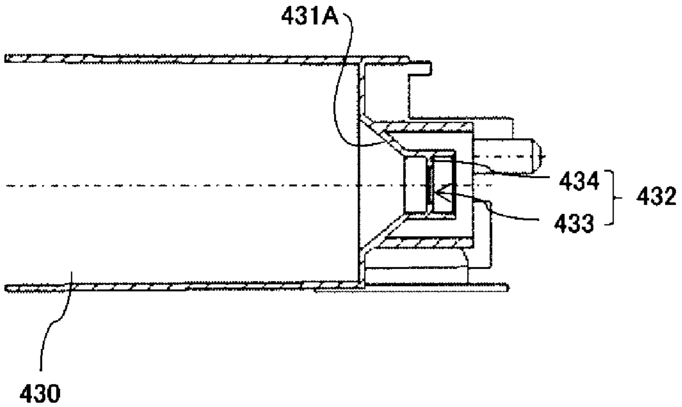

As illustrated in FIGS. 11A and 11B, the storage container body 410A has a toner storage space 430A of a large volume in which the most of toner is stored and the stirring paddle 403 is disposed and a toner conveyance space 440. The toner storage space 430A has a first tapered portion 431A on an end 413 located longitudinally opposite to the opening 411, where the first tapered portion 431A is tapered toward the direction longitudinally opposite to the opening 411. A first paddle supporting portion 432 that rotatably supports one end of the stirring paddle 403 is provided on the distal end of the first tapered portion 431A. The first tapered portion 431A is formed in a substantially quadrangular pyramid shape to guide the rotating shaft 409 to the first paddle supporting portion 432 when attaching the stirring paddle 403.

For the toner cartridge 315YA thus configured, the basic operation of assembling the stirring paddle 403 is similar to that of the first embodiment, so that the description on the assembly operation will be omitted.

As described above, the toner cartridge 315YA according to the second embodiment includes the first tapered portion 431A formed in a substantially quadrangular pyramid. So that when the stirring paddle 403 is assembled to the storage container body 410A, the first tapered portion 431A guides the rotating shaft 409 of the stirring paddle 403 to the first paddle supporting portion 432. In this manner, an assemble personnel can easily insert the stirring paddle 403 in the first paddle supporting portion 432. As a result, the operation time is shortened, and the productivity improves.

Furthermore, since the first tapered portion 431A is formed in a substantially quadrangular pyramid shape, the toner cartridge 315YA can be manufactured easily.

Third Embodiment

Figure 12:
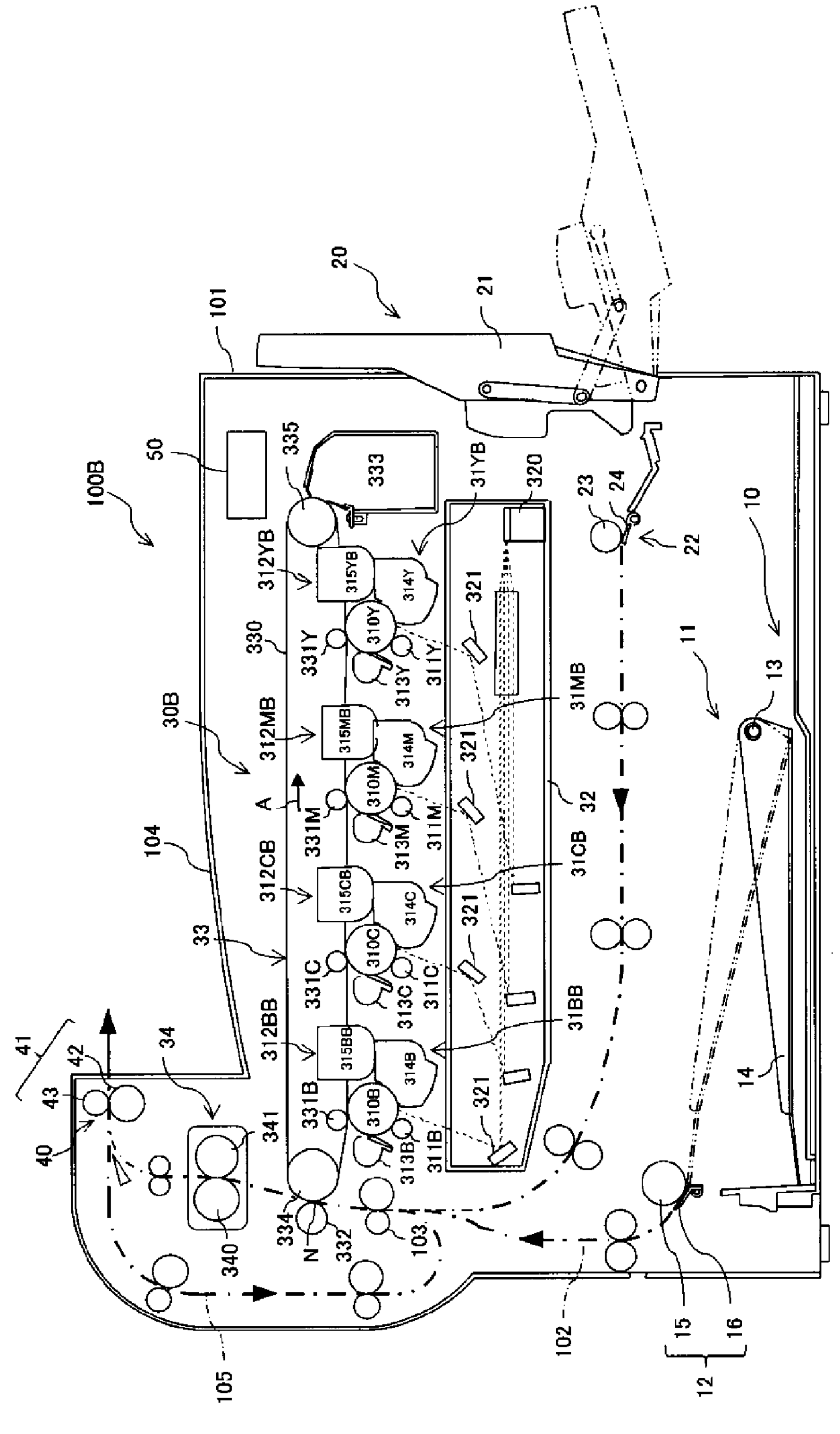
FIG. 12 is a figure illustrates a cross sectional view schematically illustrating a printer according to a third embodiment of the present invention.

A printer 100B according to a third embodiment of the present invention will be described referring to FIG. 12 while quoting FIG. 2. The printer 100B according to the third embodiment is different from the first embodiment in that a tapered portion (first tapered portion) is provided only to the storage container body of a toner cartridge 315YA (a front cover has no second tapered portion). Description is made for the third embodiment mainly on the front cover having no second tapered portion. The component configured similarly to that of the first embodiment is appended with the same reference sign, and the description thereof is omitted. FIG. 12 is a cross sectional view schematically illustrating the printer 100B according to the third embodiment of the present invention.

As illustrated in FIG. 12, the printer 100B includes a sheet feeding section 10, a manual-feed unit 20, an image forming section 30B, a sheet discharge section 40, and a controller 50. The image forming section 30B includes four processing cartridges (image forming units) 31YB to 31BB, an exposure device 32, a transfer section 33, and a fixing section 34. The processing cartridge 31YB includes a photoreceptor drum 310Y, an electrifying roller 311Y, a developing device 312YB, and a cleaner unit 313Y. The developing device 312YB includes a developing device body 314Y and a toner cartridge (toner storage device) 315YB.

As illustrated in FIG. 2, the toner cartridge 315YB includes a toner storage container (toner storage case) 400B storing toner, an auger screw 401, a driving force transmitting gear 402, a stirring paddle 403, and a driving force transmitting gear (driving unit) 404. The toner storage container (toner storage case) 400B includes a storage container body 410 and a front cover 420B.

The front cover 420B is formed to seal an opening 411 of the storage container body 410. The front cover 420B includes a second paddle supporting portion (second supporting portion) 422 that rotatably supports the other end of the stirring paddle 403 and a second screw supporting portion 423 that rotatably supports the upstream end along the toner conveyance direction of the auger screw 401. That is, the front cover 420B is configured without a second tapered portion 424.

As described above, the toner cartridge 315YB according to the third embodiment includes the storage container body 410 provided with the first tapered portion 431 that guides the rotating shaft 409 of the stirring paddle 403 to the first paddle supporting portion 432. In this manner, an assembly personnel can easily insert the stirring paddle 403 in the first paddle supporting portion 432. With the stirring paddle 403 supported by the first paddle supporting portion 432, the other end of the stirring paddle 403 can relatively easily be inserted in the second paddle supporting portion 422 of the front cover 420B, which shortens the operation time by some extent.

Fourth Embodiment

Figure 13:
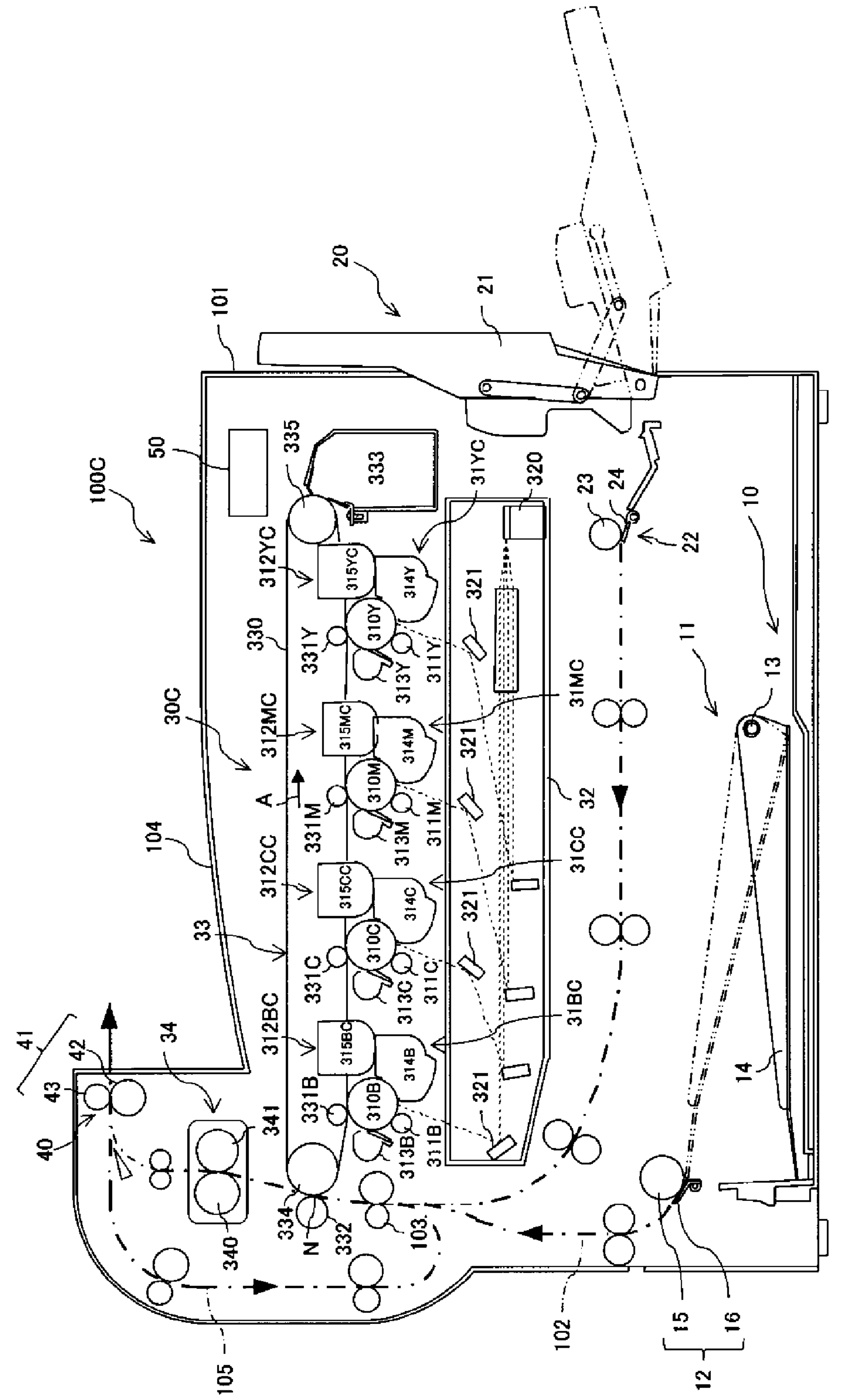
FIG. 13 is a figure illustrates a cross sectional view schematically illustrating a printer according to a fourth embodiment of the present invention.

Now, a printer 100C according to a fourth embodiment of the present invention will be described referring to FIG. 13 while quoting FIG. 2. The printer 100C according to the fourth embodiment is different from the first embodiment in that a tapered portion (second tapered portion) is provided only to the front cover of the toner cartridge 315YA (the storage container body has no first tapered portion). Description is made for the fourth embodiment mainly on the storage container body having no first tapered portion. The component configured similarly to that of the first embodiment is appended with the same reference sign, and the description thereof is omitted. FIG. 13 is a cross sectional view schematically illustrating the printer 100C according to the fourth embodiment of the present invention.

As illustrated in FIG. 13, the printer 100C includes a sheet feeding section 10, a manual-feed unit 20, an image forming section 30C, a sheet discharge section 40, and a controller 50. The image forming section 30C includes four processing cartridges (image forming units) 31YC to 31BC, an exposure device 32, a transfer section 33, and a fixing section 34. The processing cartridge 31YC includes a photoreceptor drum 310Y, an electrifying roller 311Y, a developing device 312YC, and a cleaner unit 313Y. The developing device 312YC includes a developing device body 314Y and a toner cartridge (toner storage device) 315YC.

As illustrated in FIG. 2, the toner cartridge 315YC includes a toner storage container (toner storage case) 400C storing toner, an auger screw 401, a driving force transmitting gear 402, a stirring paddle 403, and a driving force transmitting gear (driving unit) 404. The toner storage container (toner storage case) 400C is formed in a sealed container having a substantially rectangular shape. The toner storage container 400C includes a storage container body 410C having an opening 411 at a longitudinal end and a front cover 420.

The storage container body 410C includes a toner storage space 430C and a toner conveyance space 440. The toner storage space 430C is provided with a first paddle supporting portion (first supporting portion) 432 that rotatably supports the stirring paddle 403 at an end 413 located longitudinally opposite to the opening 411. That is, the toner storage space 430C is configured with no first tapered portion 431.

As described above, the toner cartridge 315YC according to the fourth embodiment includes the front cover 420 provided with the second tapered portion 424. Thus the stirring paddle 403 can easily be sealed in the storage container body 410C. As a result, the operation time is shortened, and the productivity improves.

The embodiments of the present invention are described above, it should not be construed that the scope of the present invention is limited to the embodiments described above. The effects of the embodiments described above are merely examples of the preferable effect that the present invention provides. The scope of the effect of the present invention is not limited to the effects of the embodiments described above.

For example, the toner cartridge 315Y that supplies toner to the developing device body 314Y is described as a toner storage device in the embodiment, although the embodiment of the present invention is not limited to such configuration. The toner storage device can be used for a toner storage case similarly configured to include a stirring paddle, such as a cleaner section for collecting remaining toner on a photoreceptor drum or a secondary transfer belt.

What is claimed is:

1. A toner storage device comprising:

a toner storage case that stores toner; and a stirring paddle which is rotatably supported in the toner storage case and which comprises:

at least one stirring blade that stirs the toner stored in the toner storage case; and a rotating shaft that rotates the at least one stirring blade, wherein the toner storage case comprises:

a first supporting portion that rotatably supports an end of the rotating shaft of the stirring paddle;

a second supporting portion that rotatably supports an other end of the rotating shaft; and a tapered portion that is tapered toward the first supporting portion and that is concentric with the rotating shaft.

2. The toner storage device according to claim 1, wherein the tapered portion is formed in a substantially conical shape.

3. The toner storage device according to claim 1, wherein the tapered portion is formed in a pyramid shape.

4. The toner storage device according to claim 1, wherein an end of the stirring blade positioned at the end of the rotating shaft is shaped to fit along inclination of the tapered portion.

5. The toner storage case according to claim 1, wherein the toner storage case comprises:

a storage case body including the first supporting portion, the tapered portion, and an opening that is located in an opposite side of the first supporting portion of the rotating shaft and allows the stirring paddle to be inserted therein; and a lid portion that includes the second supporting portion and that seals the opening with the second supporting portion while rotatably supporting the other end.

6. The toner storage device according to claim 5, wherein the lid portion includes a lid side tapered portion that is tapered toward the second supporting portion.

7. The toner storage device according to claim 6, wherein an end of the stirring blade located at the other end of the rotating shaft is shaped to fit along inclination of the lid side tapered portion.

8. The toner storage device according to claim 6, wherein the lid side tapered portion is concentric with the second supporting portion.

9. The toner storage device according to claim 5, further comprising a driving force transmitting unit that transmits a drive force to rotate the stirring paddle, wherein the rotating shaft comprises:

a shaft body;

a coupling portion which is provided on an end of the shaft body and is to be coupled to the driving force transmitting unit; and a flange protruding from the coupling portion in a direction perpendicular to an axial direction of the rotating shaft;

the first supporting portion comprises:

an engagement portion that engages with the flange; and a through hole allowing the coupling portion to penetrate therethrough from inside to outside the storage case body; and the driving force transmitting unit couples from outside the storage case body with the coupling portion penetrating the storage case body, with the flange and the engagement portion engaging with each other.

10. The toner storage device according to claim 9, wherein the through hole is formed in a size that provides a predetermined allowance between the through hole and the coupling portion disposed in the through hole; and the toner storage device further comprises a sealing member which is arranged between the engagement portion of the first supporting portion and the driving force transmitting unit.

11. The toner storage device according to claim 9, wherein the driving force transmitting unit comprises:

a gear part; and a drive shaft which is provided on a rotating shaft of the gear part and is to be coupled to the coupling portion.

12. The toner storage device according to claim 11, wherein the drive shaft is formed in a male-shape, and the coupling portion is formed in a female-shape.

13. A toner cartridge comprising the toner storage device according to claim 1, wherein the toner storage case of the toner storage device is provided with a discharge port for discharging the toner.

14. The toner cartridge according to claim 13 further comprising:

an auger screw provided inside the toner storage case and that conveys toner stored in the toner storage case; wherein the discharge port is provided in a downstream side along a direction along which the auger screw conveys the toner.

15. An image forming unit comprising:

a photoreceptor drum on which an electrostatic latent image is formed; and a developing device that develops the electrostatic latent image formed on the photoreceptor drum into a toner image; wherein the developing device comprises:

a developing device body; and the toner cartridge according to claim 1 to supply the toner stored in the toner cartridge to the developing device body.

16. The image forming unit according to claim 15, wherein the toner cartridge is detachably connected to the developing device body.

17. An image forming apparatus comprising:

an image forming section including the image forming unit according to claim 15;

a transfer section that transfers the toner image formed by the image forming unit onto a sheet;

a fixing section that fixes the toner image transferred onto the sheet; and a sheet feeding section that feeds the sheet to the image forming section.

* * * * *